United States Patent
Gerez

(10) Patent No.: US 7,583,200 B2
(45) Date of Patent: Sep. 1, 2009

(54) METHOD AND SYSTEM FOR DETECTING AND MEASURING THE DISTURBANCES IN TERMS OF FREQUENCY OF THE RATE OF ROTATION OF A ROTOR

(75) Inventor: Valerio Gerez, Yerres (FR)

(73) Assignee: SNECMA, Paris (FR)

( * ) Notice: Subject to any disclaimer, the term of this patent is extended or adjusted under 35 U.S.C. 154(b) by 377 days.

(21) Appl. No.: 11/551,536

(22) Filed: Oct. 20, 2006

(65) Prior Publication Data

US 2007/0090961 A1   Apr. 26, 2007

(30) Foreign Application Priority Data

Oct. 21, 2005 (FR) .................................. 05 53209

(51) Int. Cl.
- G08B 21/00 (2006.01)
- G01F 17/00 (2006.01)
- G01B 5/28 (2006.01)
- G01P 5/00 (2006.01)
- G01P 3/56 (2006.01)

(52) U.S. Cl. ...................... 340/679; 340/686.3; 702/56; 702/35; 702/190; 702/144; 324/161

(58) Field of Classification Search ................. 340/679, 340/686.3
See application file for complete search history.

(56) References Cited

U.S. PATENT DOCUMENTS

| | | | |
|---|---|---|---|
| 4,072,364 A * | 2/1978 | Gudat et al. ................... 701/71 |
| 4,195,291 A | 3/1980 | Burks, Jr. |
| 4,506,312 A | 3/1985 | Chan et al. |
| 4,742,332 A * | 5/1988 | Schroeder et al. ............. 341/15 |
| 4,835,467 A | 5/1989 | Gokhale |
| 5,103,213 A | 4/1992 | Marsh et al. |
| 5,170,365 A | 12/1992 | Collopy et al. |
| 5,365,787 A * | 11/1994 | Hernandez et al. ............ 73/660 |
| 5,390,545 A * | 2/1995 | Doan .......................... 73/650 |
| 5,831,429 A * | 11/1998 | Germanetti ................. 324/161 |
| 6,876,167 B1 | 4/2005 | Jones |
| 6,904,371 B2 * | 6/2005 | Sonnichsen et al. .......... 702/56 |
| 7,117,744 B2 * | 10/2006 | Hobelsberger et al. ........ 73/660 |
| 7,149,646 B2 * | 12/2006 | Certain ....................... 702/144 |
| 2004/0176902 A1 * | 9/2004 | McBrien et al. ............. 701/100 |

* cited by examiner

Primary Examiner—Daniel Wu
Assistant Examiner—Fekadeselassie Girma
(74) Attorney, Agent, or Firm—Oblon, Spivak, McClelland, Maier & Neustadt, P.C.

(57) ABSTRACT

A method and system for detecting the variations of speed (R) of a rotor. Signals are measured representative of the march-past of the teeth of a measurement device secured to the rotor for a determined duration (T). The measurements are sampled, digitized and stored to obtain an initial digital vector (B). A detection signal is extracted around a known disturbing frequency (F). The detection signal is compared with a predetermined threshold (SO) and an alert message is delivered in the event of overshoot.

12 Claims, 7 Drawing Sheets

Figure 1:
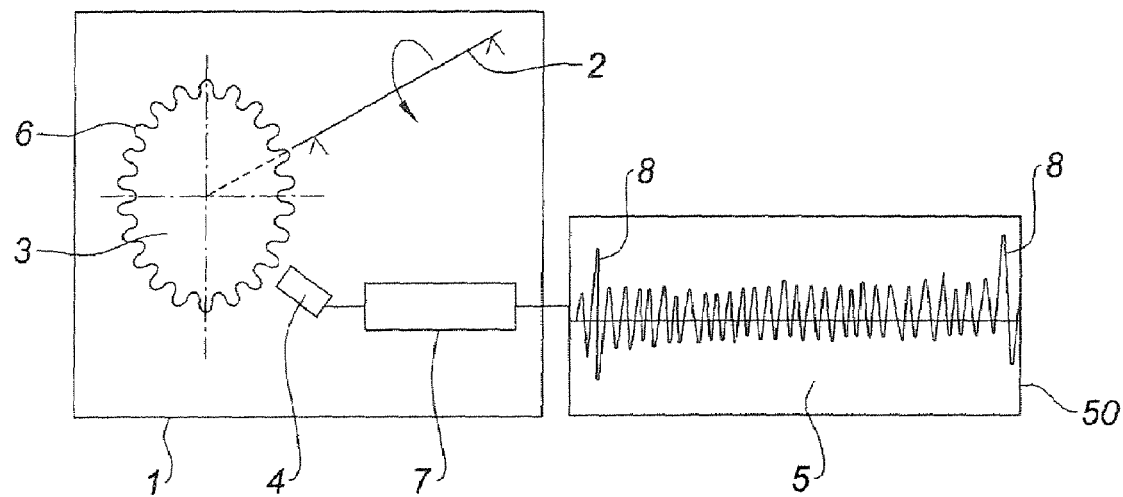

| A | B | C | D | E | G | H |
|---|---|---|---|---|---|---|
| 1 | -0,774 | -0,803 | -0,7885 | ... | ... | ... |
| 2 | -0,741 | -0,774 | -0,7575 | -0,803 | -0,78025 | ... |
| ... | -0,711 | -0,741 | -0,726 | -0,774 | -0,75 | ... |
| ... | ... | ... | ... | ... | ... | ... |
| ... | ... | ... | ... | ... | ... | ... |
| ... | -0,121 | -0,145 | -0,133 | ... | ... | ... |
| ... | 0,005 | -0,121 | -0,058 | -0,145 | -0,1015 | ... |
| ... | 0,134 | 0,005 | 0,0695 | -0,121 | -0,02575 | ... |
| ... | ... | 0,134 | ... | ... | ... | ... |
| ... | ... | ... | ... | ... | ... | ... |
| j-1 | 0,865 | 0,806 | 0,8355 | ... | ... | ... |
| j | 0,902 | 0,865 | 0,8835 | 0,806 | 0,84475 | ... |
| j+1 | 0,873 | 0,902 | 0,8875 | 0,865 | 0,87625 | ... |
| ... | ... | 0,873 | ... | ... | ... | ... |
| ... | ... | ... | ... | ... | ... | ... |
| ... | ... | ... | ... | ... | ... | ... |
| ... | 0,357 | 0,333 | -0,345 | ... | ... | ... |
| N | 0,374 | 0,357 | 0,3655 | 0,333 | 0,34925 | ... |
| ... | ... | 0,374 | ... | ... | ... | ... |

| A | H | I >0? | J | K | L | M | P | Q | S |
|---|---|---|---|---|---|---|---|---|---|
| 1 | ... | ... | ... | ... | ... | ... | ... | ... | ... |
| 2 | -0,78025 | 0 | 0 | 0 | 0 | 0 | ... | ... | ... |
| ... | -0,75 | 0 | 0 | 0 | 0 | 0 | 0 | 0 | 0 |
| ... | ... | ... | ... | 0 | 0 | 0 | 0 | 0 | 0 |
| ... | ... | ... | ... | ... | ... | ... | 0 | 0 | 0 |
| ... | ... | ... | ... | ... | ... | ... | ... | ... | 0 |
| k-1 | -0,1015 | 0 | 0 | ... | ... | ... | ... | ... | ... |
| k | -0,02575 | 0 | 0 | 0 | 0 | 0 | 0 | 0 | 0 |
| k+1 | 0,065 | 1 | 0,065 | 0 | 0,065 | 1 | 0 | 1 | 0 |
| ... | ... | ... | ... | 0,065 | ... | 1 | 1 | 0 | 0 |
| ... | ... | ... | ... | ... | ... | ... | 1 | 0 | 0 |
| j-1 | 0,878 | 1 | 0,878 | ... | ... | ... | ... | ... | ... |
| j | 0,902 | 1 | 0,902 | 0,878 | 0,024 | 1 | 1 | 0 | 0 |
| j+1 | 0,873 | 1 | 0,873 | 0,902 | -0,029 | 0 | 1 | -1 | 1 |
| ... | ... | 1 | 0,845 | 0,873 | -0,028 | 0 | 0 | 0 | 0 |
| ... | ... | ... | ... | 0,845 | ... | 0 | 0 | 0 | 0 |
| ... | ... | ... | ... | ... | ... | ... | ... | ... | ... |
| ... | ... | ... | ... | ... | ... | ... | ... | ... | ... |
| N | 0,34925 | 1 | 0,34925 | ... | ... | ... | ... | ... | ... |
| ... | ... | 1 | ... | 0,34925 | ... | ... | ... | ... | ... |

METHOD AND SYSTEM FOR DETECTING AND MEASURING THE DISTURBANCES IN TERMS OF FREQUENCY OF THE RATE OF ROTATION OF A ROTOR

The invention relates to systems for detecting and measuring the disturbances in terms of frequency of the rate of rotation of an airplane engine rotor, and more generally of an arbitrary engine speed.

Currently, the detection and the measurement of the low-frequency variations or disturbances of the rotation of a rotor is performed in two steps:
- a step of acquiring and recording the analog signals delivered by a proximity detector disposed on the circumference of a toothed wheel, termed a phonic wheel, coaxial and secured to the rotor.
- a step of off-line signal analysis of the signals of the recording and of printout of the results of the analysis.

This analysis system is not suitable when we want the results to be available in real time, in particular when these results relate to rotors of airplane engines and are intended to supply an in-flight safety system.

The Applicant has sought to solve this problem and to have available a method making it possible to recognize in real time the disturbances of rate of an airplane engine rotor.

For this purpose, the invention relates first of all to a method of detecting the variations of speed of a rotor characterized by the fact that it consists, in real time, in:
- measuring signals representative of the march-past of the teeth of a phonic wheel or of an equivalent means secured to the rotor for a determined duration,
- sampling, digitizing and storing the measurements performed to obtain an initial digital vector,
- extracting from the initial vector a detection signal around a known disturbing frequency,
- comparing the detection signal with a predetermined threshold, and
- delivering an alert message in the event of overshoot.

It is thus possible to react immediately to the appearance of a known disturbing frequency on the engine speed, such as disturbances of lower frequency than that of the rotation of the rotor, for example by temporarily changing engine speed so as to arrest the disturbance as soon as possible.

Preferably, to extract a signal of detection of the disturbing frequency:
- the initial vector is filtered and a filtered vector is obtained,
- alternation peaks of the signals are detected,
- the peaks are dated, the time intervals separating the adjacent peaks are calculated, the temporal evolution of the speed is established on the basis of these intervals, and
- the said evolution is filtered around the known disturbing frequency.

Advantageously, the above vectors are tagged in relation to a time base of dimension that is determined from the speed, the characteristics of the measurement means and the known disturbing frequency.

The vector operations applied to the vectors comprise only sums, differences, coordinate shifts.

This method avoids calculations that are complicated to do in real time.

Advantageously again, the signals are sampled at a frequency at least twice as high as those of the transients which may possibly be present therein, so as to reserve the possibility of also analysing the disturbances of frequencies greater than that of the rotation of the rotor.

The invention also relates to a system for detecting the variations of speed of a rotor, comprising measurement means comprising a sensor delivering in real time signals representative of the rate of rotation of the rotor, characterized by the fact that it comprises means of processing of the signals comprising a calculation block calculating in real time the rate of rotation so as, if appropriate, to instantaneously emit a speed disturbance message.

Preferably, the calculation block delivers a message of abnormal appearance of a disturbance of frequency lower than the frequency of rotation of the rotor.

Preferably again, the measurement means comprise a phonic wheel secured to the rotor delivering signals representative of the march-past of the teeth of the phonic wheel, and in which the processing means sample the said signals before digitizing them and storing them in digital form.

Advantageously, the processing means sample the signals at a frequency at least twice as high as that which is maximal of the transient disturbances which may be present therein, thereby making it possible to also analyse the disturbances of frequency higher than the frequency of rotation of the rotor.

The detection system of the invention makes it possible in particular to implement the above method.

Figure 2:
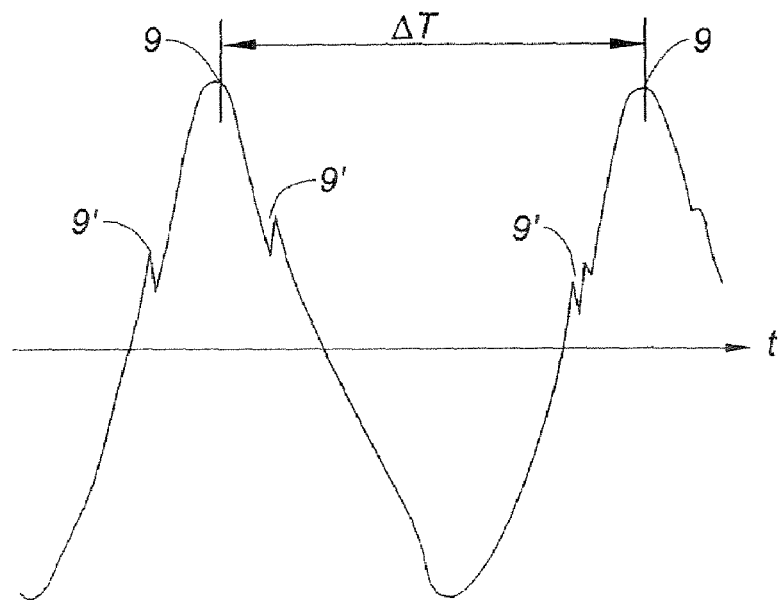
Figure 3:
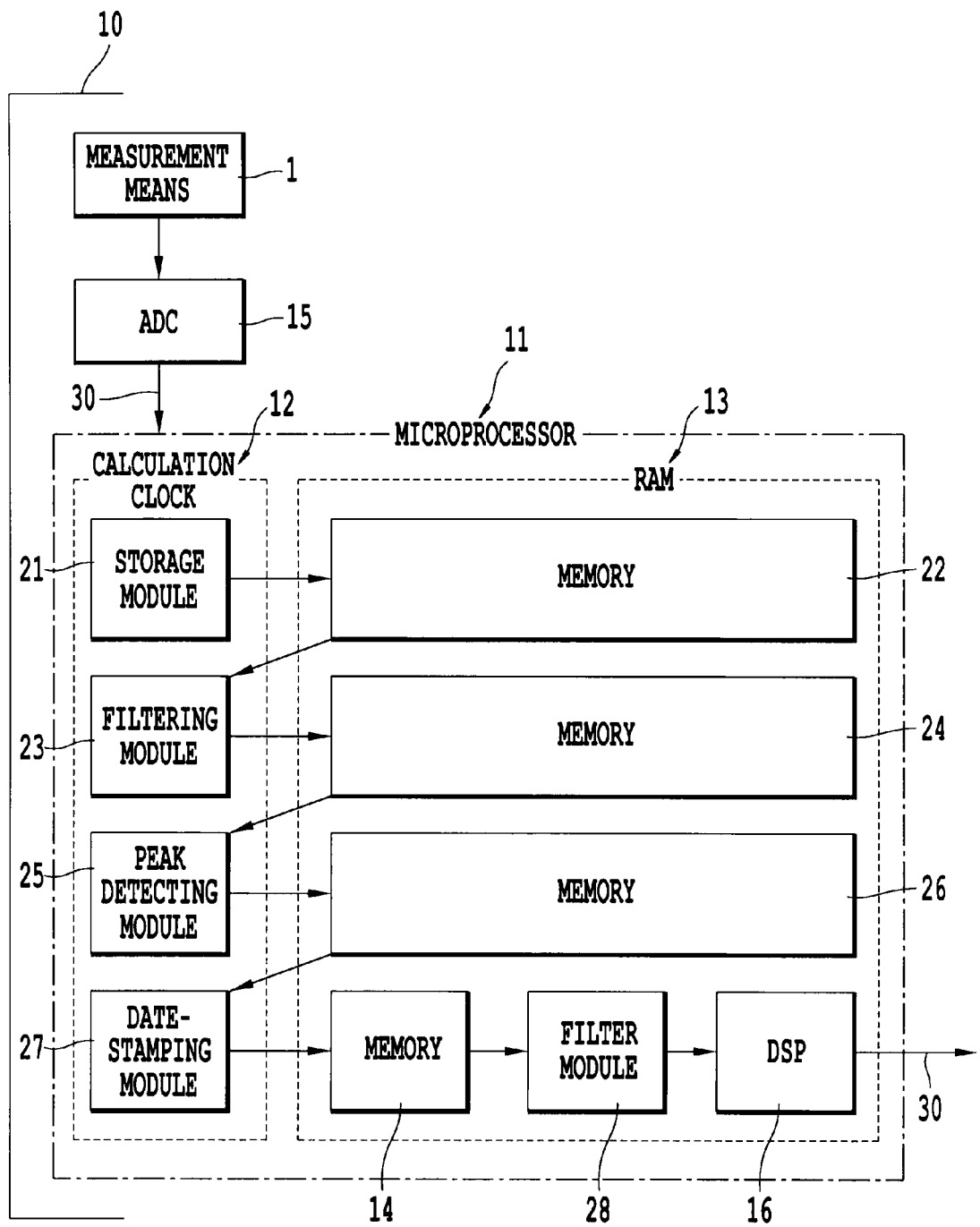
Figure 4:
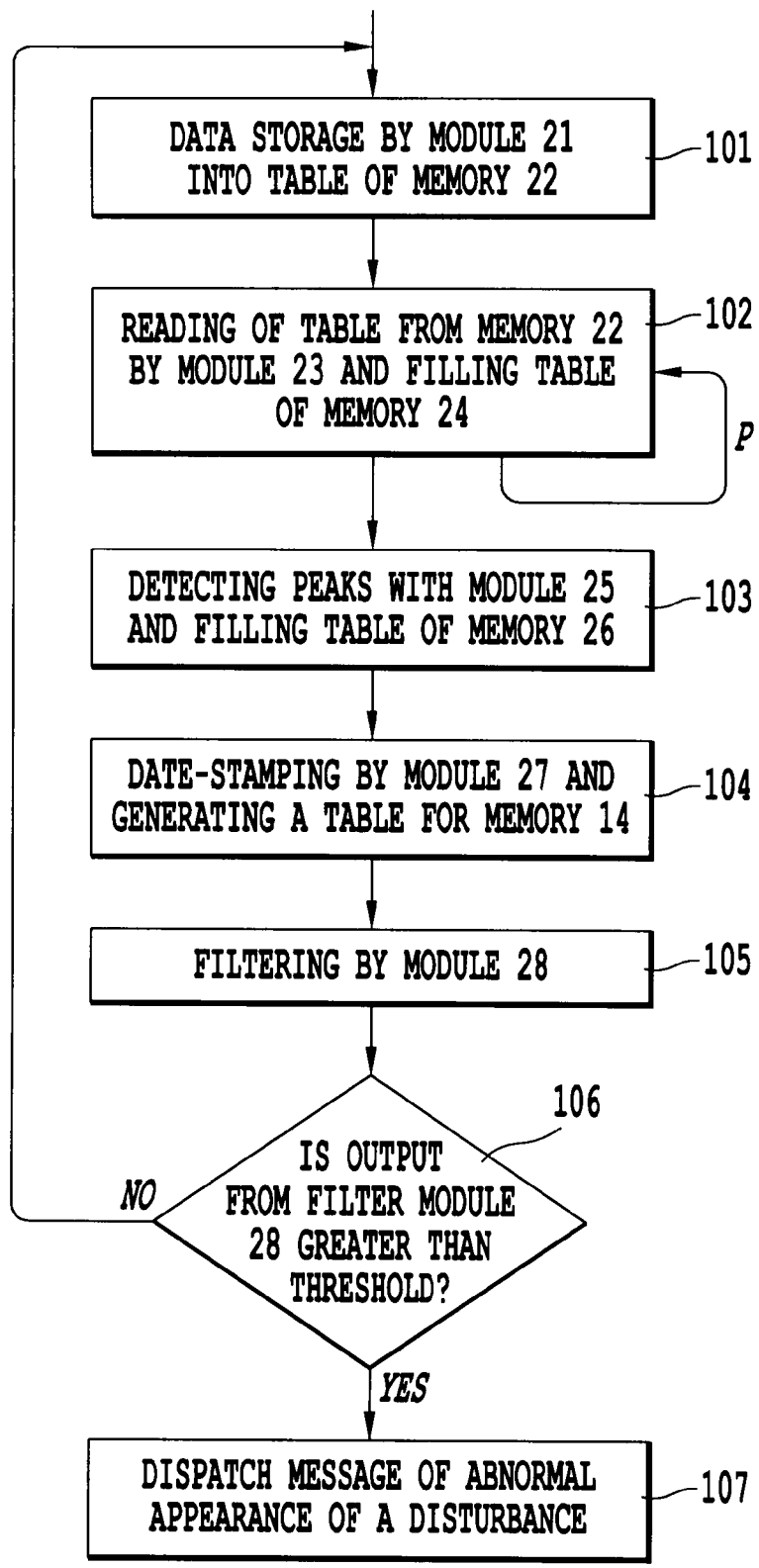
Figures 5, 6:
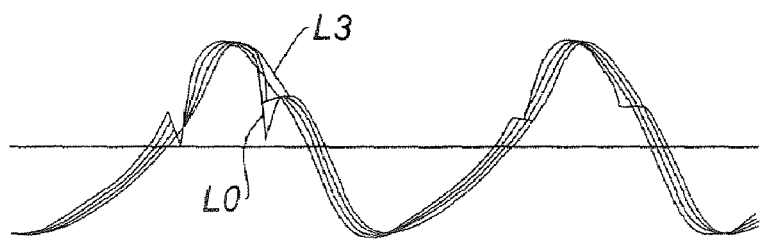
Figures 7, 8:
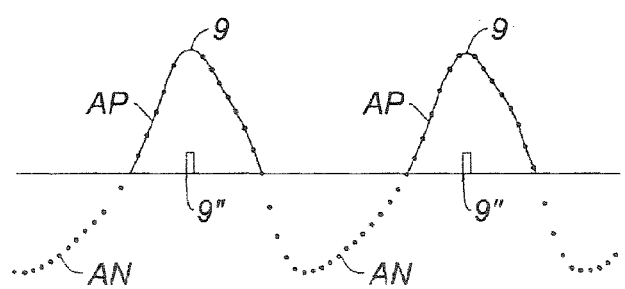
Figure 9:
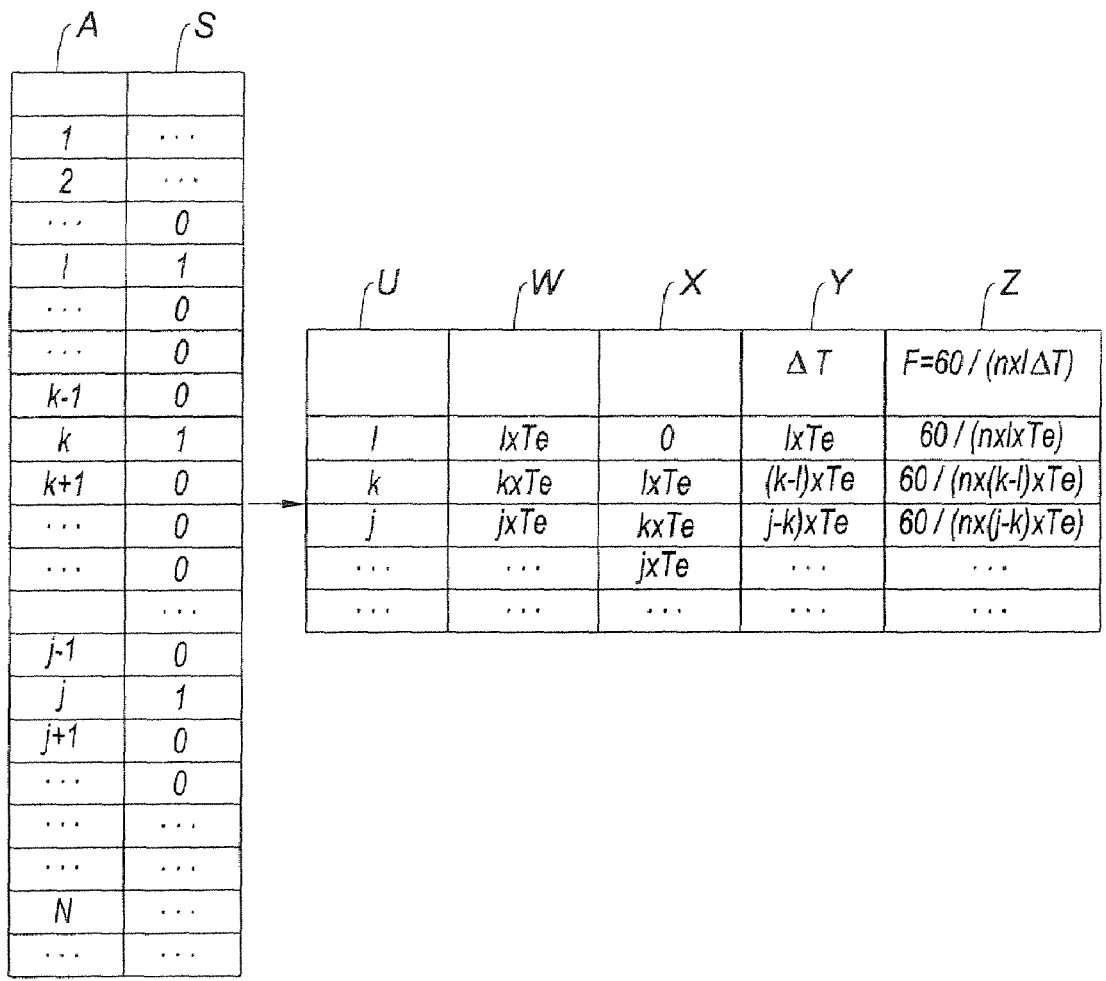
Figure 10:
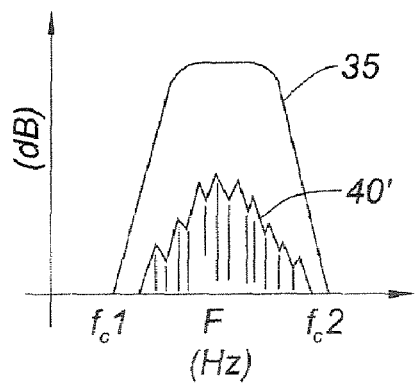
Figure 11:
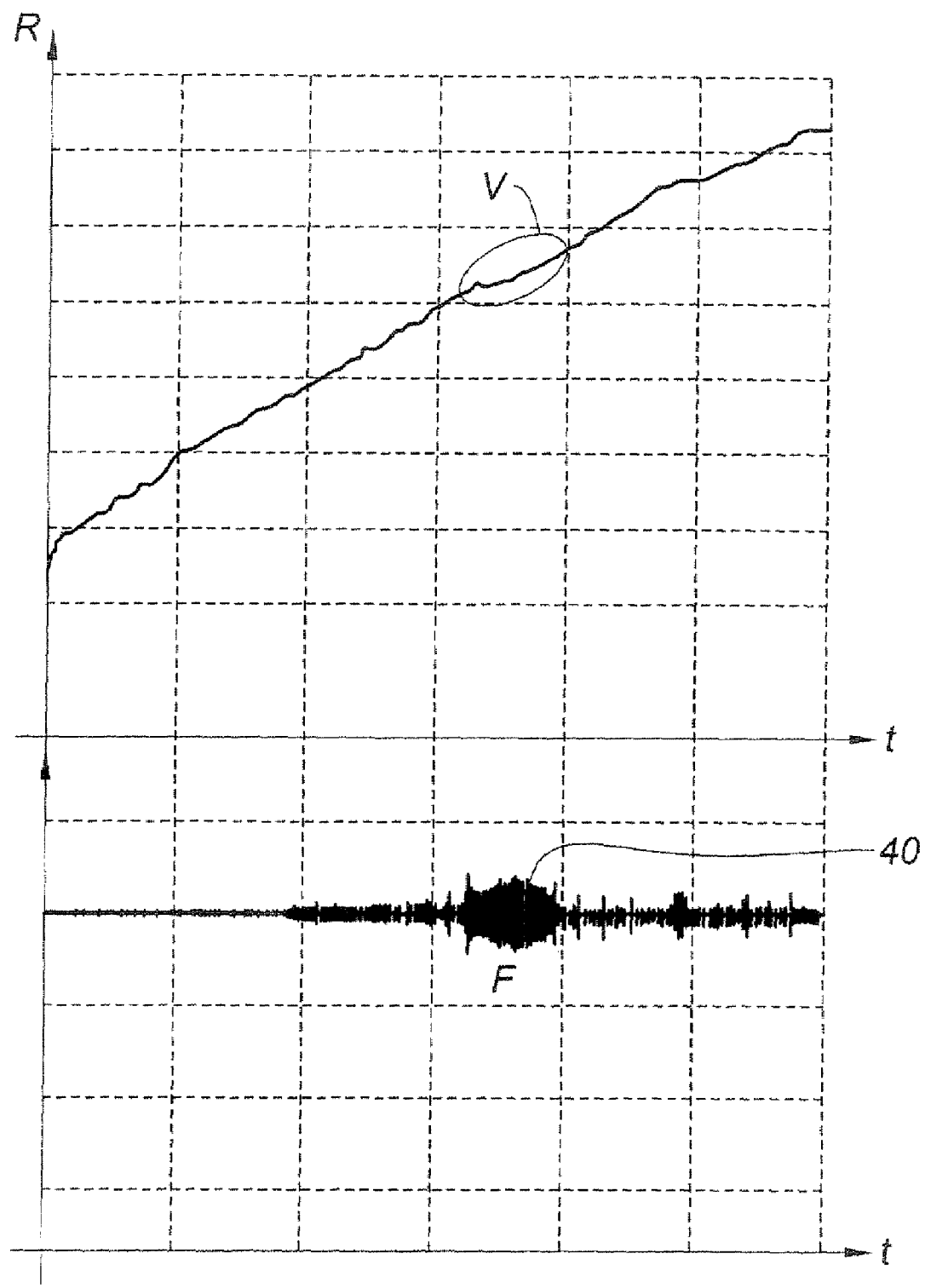

The invention will be better understood with the aid of the following description of an exemplary embodiment of the system for detecting the low-frequency variations of the rate of rotation of a rotor according to the invention, with reference to the appended drawing, in which:

FIG. 1 is a diagrammatic view of a rotor and of its detection means entering the composition of the detection system according to the invention, FIG. 2 is an exemplary temporal timechart of the signals delivered by the detection means hereinabove, FIG. 3 is a functional block diagram of the detection system according to the invention, FIG. 4 is a functional flowchart of the method for processing signals so as to detect the speed disturbance, according to the invention, FIG. 5 is a diagram showing the structure and the evolution of the calculations of the filtering module, FIG. 6 is a temporal timechart showing the effect of the above filtering, FIG. 7 is a diagram showing the structure and the evolution of the calculations of the module for detecting peaks, FIG. 8 is a temporal timechart showing the effect of the above detection, FIG. 9 is a diagram showing the evolution of the calculations of the variations of the rate of rotation of the rotor, FIG. 10 shows a filtering template for filtering the disturbance in accordance with the invention, and FIG. 11 shows a temporal chart of evolution of the rate of rotation of the rotor obtained by the detection system according to the invention, to which is appended the chart of the result of the application of the filtering of the disturbance.

With reference to FIG. 1, the means 1 of measurement of the variations or disturbances in terms of frequency F of the rate of rotation or of the speed R of a rotor 2, or other revolving spindle, are made up principally of a phonic wheel 3 and of a sensor 4.

A phonic wheel is a toothed wheel with the same spindle as the rotor 2 and driven by it. The sensor 4 may be an induction coil and the teeth 6 of the wheel 3 carry a magnetic material.

But any other means capable of delivering pips of fractions of revolutions of the rotor 2 may be suitable. According to the technology of this means, it is possible that certain filtering operations set forth hereafter are no longer necessary.

The magnetic materials excite the coil as the teeth march past the sensor and thus generate rotation signals (not represented) representative of this march-past so as to serve for the measurement of the rate of rotation of the rotor 2.

The rotation signals are shaped by a conditioner circuit 7 which delivers an analog measurement signal 5, and having approximately the shape of a pseudo-periodic triangular signal substantially reproducing the shape of the teeth 6.

Ordinarily, the signal 5 is recorded by an analog recording means 50 such as a magnetic tape recorder for the subsequent analysis of the signal.

The wheel 3 comprises n teeth, one of them being larger than the other n−1, so that the signal 5 contains larger alternations of signal 8 constituting pips of revolutions of rotation of the rotor 2.

The shape of a few alternations of the signal 5 is shown more precisely in FIG. 2. It comprises positive and negative alternations, the crests 9 or the peaks of two successive positive alternations being separated by a time interval or pseudo-period $\Delta T$.

It is also noted that the signal 5 may be marred by spurious and transient noise 9' generally due to transient disturbances at "high" frequencies, that is to say frequencies higher than the frequency of rotation of the rotor 2. They can give rise to an erroneous period detection $\Delta T$.

Here, with reference to FIG. 3, the measurement means 1 form part of a system 10 for real time detection of the variations of the speed R.

These variations are fluctuations called "low-frequency", of known frequency F, that is to say lower than the frequency of rotation of the rotor 2.

The system 10 furthermore comprises processing means consisting of an analog-digital converter ADC 15 and of a unit 11 for processing the digital signals. The processing unit can for example consist of a microprocessor.

The converter 15 and the unit 11 are linked by a digital data bus 30.

The unit 11 comprises a calculation block 12 and a RAM memory 13 (random access memory) associated with the block 12, so as to serve for the storage and for the processing of the digitized data arising from the ADC 15.

The block 12 is also linked to an electronic circuit DSP 16 (digital signal processing) for processing the signal and for signalling. Here the signalling consists of the emission of a message in real time on a computer bus 30 to a safety system (not represented).

The ADC 15 digitizes the signals 5 by sampling them at a chosen frequency Fe at least equal to $2.56/\Delta T$, by application of Shannon's theorem.

This frequency is thus sufficient to obtain sampled and digitized data making it possible to correctly analyse the "low frequencies" present in the signals 5 delivered by the measurement means 1.

But the frequency Fe can also be chosen greater than that above to the point of being sufficient to be able to analyse the transient spurious noise 9' due to transient disturbances.

The calculation block 12 comprises a module 21 for storing the digitized data, a filtering module 23, a module 25 for detecting the crests or the peaks, and a date-stamping module 27.

The module 21 stores the digitized data and stashes them as a column of values according to the sampling order, values tagged by a column of indices i, which is parallel therewith. The filtering module 23 filters the data until the transient noise 9' is made to disappear. The module 25 detects crests and peaks, that is to say maximal values of the samples corresponding to the transits of the crests of the teeth 6 past the sensor 4. The date-stamping module 27 dates these transits and deduces therefrom the time intervals $\Delta T$ separating them.

The memory 13 is structured as four memories 22, 24, 26, 14 each containing a table and storing the digital data arising from the sampling of the signal 5 and the successive processings of the modules 21, 23, 25 and 27.

FIGS. 4, 6, 8 show an example of each of the tables of the memories 22, 24, 26, 14 hereinabove.

The columns of values and of indices form an initial vector of values numbered from 1 to N, and a base vector serving as temporal tag, each index or row i corresponding to a temporal coordinate of the initial vector. The RAM memory 13 comprises other "derived" vectors, described subsequently in the document, referenced in the same tag.

As was seen above, Fe is chosen at least equal to $2.56/\Delta T$, that is to say $2.56.n.R$, Te must be less than $1/2.56.n.R$ and the analysis duration T must at least be greater than $1/F$, thereby dimensioning the size N of the vectors in the RAM memory 13.

But to perform an average over k analyses, it is preferable to choose T slightly greater than $k/F$.

Moreover, a time Te, equal to $1/Fe$, separates the successive values of index i and i+1, as will be explained in greater detail subsequently.

It follows from this that the size N of the memories 22, 24, 26, 14 must therefore be at least equal to T/Te, that is to say to $2.56.n.R/F$, or better $2.56.k.n.R/F$. It therefore depends on the number n of teeth 6 of the phonic wheel 3, the speed R and the disturbing frequency F.

The operation of the system 10 will now be explained with reference to FIGS. 4 to 9.

The rotor 2 revolving, the periphery of the wheel 3 travels past the sensor 4, thereby causing the appearance of the analog signal 5.

The signal 5 is sampled and converted into digital data in the converter 15, which transmits them to the calculation block 12 of the unit 11 through the bus 30.

During a step 101, with reference to FIG. 4, the storage module 21 of the block 12 stashes the values of these data, at the same time as the indices i, in the first two columns, column A "index" or temporal tag, and column B "sample" corresponding to the value of the data item corresponding to the index i, of the table of the memory 22 shown in FIG. 5.

Column B "sample" constitutes an initial vector of data with N temporal coordinates. The storage of the data in the table is stopped when the table is full, i then being equal to N.

The following processings, explained hereafter, can be executed very rapidly, so that a following step 101 can be performed at once without any drawback. It is also possible, optionally, to double the number of tables and to utilize them alternately, so as not to lose any sampled data.

The calculation block 12 then performs vector operations on the initial vector and on those derived from this vector and obtained subsequent to successive vector operations comprising exclusively shifts, sums and differences, in the temporal space of dimension N, in the order which will be described now.

The block 12 actuates the filtering module 23, which, during a step 102, reads the table of the memory 22, completes it by filling in the table of the memory 24:

1) with a column C "$1^{st}$ shift" which is a vector obtained by shifting by a row, rows i to i+1, the data of the initial vector, thereby constituting an operation of shifting of the temporal coordinates of the initial vector in the temporal space of dimension N, 2) with a column D "$1^{st}$ average", obtained by calculating, for each of its rows i, the sum B+C of the values of the data in row i of the preceding two columns B and C, divided by two so as to obtain the average thereof (but this division is not obligatory).

3) The module 23 repeats these two operations p times until a column "p+1$^{th}$ shift" (not represented) and a column H "p+1$^{th}$ average" are obtained.

Shown in FIG. 6 is the filtering L3 of the original signal 5, designated Lo, obtained by this calculation if p+1=3. The transient noise 9' has disappeared.

In the case where one is searching for a "high" frequency disturbance causing transient noise or pulses 9', step 102 is skipped.

At the end of the filtering, the block 12 actuates the module 25 so as to execute a step 103 for detecting peaks.

For this purpose, the module 25 reads the table of the memory 24, completes it through the table of the memory 26, successively with the columns or vectors I "p+1$^{th}$ average>0?", J "alternation>0", with first columns K "shift" and L "difference", with a column M "difference>0?>>", with second columns P "shift" and Q "difference" and finally with a column S "difference of the peaks<0", as are shown in FIG. 7.

More precisely, the module 25:

1) fills the rows i of column I "p+1$^{th}$ average>0?" with 1 or with 0 in the following manner:
   if row i of the last column H of the table of the memory 22 contains a positive average value, row i of column I is filled with a 1.
   otherwise, row i of column I is filled with a 0.

2) calculates column J "alternation>0" by performing the product row i by row i of the preceding two columns H.I, thereby making it possible to obtain therein the values of the digital data of a signal AP derived from the preceding filtered signal L3. As is shown in FIG. 8, this new signal AP is purged of its negative pseudo-alternations AN.

3) generates, on the basis of column J "alternation>0" the first columns K "shift" and L "difference" equal to J−K, like the module 23 has previously generated columns C "1$^{st}$ shift" and D "1$^{st}$ average" on the basis of column B "sample", except that the sums or averages are replaced with differences.

4) tests the sign of the above differences J−K of row i of column L "difference", and fills row i of column M "difference>0?" with 1 if the difference is positive, otherwise with 0.

5) generates, on the basis of column M "difference>0?", the second columns P "shift" and Q "difference", like the above first columns K "shift" and L "difference" on the basis of column J "alternation>0".

6) finally generates column S "difference of the peaks<0" by filling its rows i with 1 if the corresponding rows i of column L "difference" are filled with −1, otherwise with 0. The latter column S comprises the digital data of a binary signal simultaneous with the signal AP comprising only 0s almost everywhere, except is or pulses 9'', opposite the peaks 9 of the positive alternations, as is shown in FIG. 8.

At the end of the detection of the peaks, the calculation block 12 actuates the module 27 so as to execute a step 104 of date-stamping.

It then utilizes the last column S "difference of the peaks<0" established during step 103 and column A "index i" of the table of the memory 22 to generate the table of the memory 14, such as shown in FIG. 9 and explained hereafter.

During step 104, the module 27 calculates and successively fills in five columns U, W, X, Y, Z of the table of the memory 14.

The first column U is filled with the indices 1, k, j, . . . , corresponding to nonzero rows of column S.

Thereafter, the module 27:
1) calculates the product of the index 1, j, or k by the sampling time Te, and stashes it in the second column W opposite the corresponding index,
2) shifts this second column W by a row and stashes it in the third column X,
3) takes the difference W−X between these two columns W and X to obtain in the fourth column Y the time intervals ΔT between the peaks 9'', according to the shift and difference technique implemented above.
4) calculates, according to the formula R(t)=60/(n.ΔT), the fifth column Z which makes it possible to plot a curve of evolution of the rotation speed R(t) as a function of time t, and shown in the upper part of FIG. 11.

This FIG. 11 clearly shows the transient noise or variations V of the speed of rotation of the rotor 2.

This transient noise V can be filtered at the output of the module 27 (by calculating averages as performed above) by a module 28, which is optional, so as to eliminate the high-frequency components of the curve R(t) which do not correspond to physical phenomena. These HF components can be eliminated by a filtering, in particular by a low-pass filtering, by an averaging or by other smoothing procedures.

The transient noise V can thereafter be analysed in real time in the circuit DSP 16, which makes it possible to remove the pseudo-continuous component of the curve of the speed R and to characterize the disturbance frequencies F of the rotor 2, by applying an FFT (Fast Fourier Transform) to the last column generated.

Here, the value of the disturbing frequency F is known in advance, the DSP 16 comprises a bandpass digital filter 35 centred on F and of cutoff frequencies fc1 and fc2, such as shown in FIG. 10.

After application of this filtering, during a step 105, a frequency spectrum detection signal 40' is obtained representative of the rotor speed R.

In the time domain, the detection signal 40' takes the form 40 without any pseudo-continuous component such as shown in the lower part of the timechart of FIG. 11.

If, during a test step 106 performed at the output of the above bandpass filter by the circuit DSP 16, the detection signal 40 or 40' overshoots a predetermined threshold S0 in terms of amplitude, an alarm is triggered.

The circuit 16 can then instantaneously dispatch, in a step 107, a message (30') of abnormal appearance of a disturbance of predetermined frequency (F) of the speed of rotation of the rotor (2), on the bus 30, to an operational safety system (not represented).

The invention claimed is:

1. A method of detecting variations of a speed (R) of a rotor said method comprising the steps of, in real time:
   measuring signals representative of a march-past of teeth of a measurement device secured to the rotor for a determined duration (T),
   sampling, digitizing and storing the signals to obtain an initial digital vector (B),
   extracting from the initial vector (B) a detection signal around a known disturbing frequency (F), wherein said extracting of said detection signal comprises calculating a temporal evolution R(t) of the speed (R) of the rotor, and
   analyzing in real time said temporal evolution R(t) comprises applying a Fast Fourier Transform to said temporal evolution R(t), analyzing in real time said temporal evolution R(t) of the speed (R) of the rotor with a bandpass filter of a digital signal processing module, said analyzing further comprising comparing the detection signal with a predetermined threshold and delivering an alert message in the event of overshoot.

2. The method according to claim 1, wherein said step of extracting said detection signal comprises:
filtering the initial vector (B) and obtaining a filtered vector (H),
detecting peaks (S) of alternation of the signals,
dating the peaks (S), calculating time intervals (ΔT) separating adjacent peaks, establishing the temporal evolution R(t) of the speed (R) based on said time intervals, and
filtering said temporal evolution around the known disturbing frequency (F).

3. The method according to claim 2, further comprising tagging the vectors (B, . . . , S) in relation to a time base (A) of dimension N determined from the speed (R), characteristics of the measurement device (1, n) and the disturbing frequency (F).

4. The method according to claim 1, wherein said sampling of said signals is performed at a frequency (Fe) at least twice as high as those of transient disturbances present in the signals.

5. The method according to claim 2, wherein vector operations applied to the vectors comprise exclusively sums, differences, tests and coordinate shifts.

6. A system for detecting variations of speed (R) of a rotor, comprising:
measurement means comprising a sensor delivering in real time signals representative of the a rate of rotation of the rotor,
means for signals processing comprising a calculation block calculating in real time the rate of rotation so as, if appropriate, to instantaneously emit a message of disturbance of the speed (R) and delivering a message of abnormal appearance of a disturbance of frequency (F) lower than the frequency of rotation of the rotor,
wherein said means for signals processing comprises means for calculating a temporal evolution R(t) of the speed (R) of the rotor and means for analyzing in real time said temporal evolution R(t) of the speed (R) of the rotor, said means for analyzing comprising a bandpass filter,
means for analyzing in real time said temporal evolution R(t) comprises means for applying a Fast Fourier Transform to said temporal evolution R(t).

7. The system according to claim 6, wherein the measurement means comprise a phonic wheel secured to the rotor delivering signals representative of a march-past of teeth of the phonic wheel, and wherein the processing means sample said signals before digitizing said signals and storing said signals in digital form.

8. The system according to claim 7, wherein the processing means sample the signals at a frequency (Fe) at least twice higher than a maximal frequency of transient disturbances present therein.

9. The system according to claim 6, wherein the calculation block comprises a filtering module eliminating any spurious noise present in the signals.

10. The system according to claim 6, wherein the calculation block comprises a module for detecting peaks in the signals, corresponding to transits of crests of teeth in front of the sensor.

11. The system according to claim 10, wherein the calculation block dates the peaks, and deduces therefrom time intervals (ΔT) separating the peaks.

12. The method of claim 1, wherein said step of analyzing in real time said temporal evolution R(t) comprising plotting a curve of said of temporal evolution R(t) as a function of time.

\* \* \* \* \*

UNITED STATES PATENT AND TRADEMARK OFFICE
CERTIFICATE OF CORRECTION

| | | |
|---|---|---|
| PATENT NO. | : 7,583,200 B2 | Page 1 of 1 |
| APPLICATION NO. | : 11/551536 | |
| DATED | : September 1, 2009 | |
| INVENTOR(S) | : Valerio Gerez | |

It is certified that error appears in the above-identified patent and that said Letters Patent is hereby corrected as shown below:

Column 5, line 56, change "is" to --1s--.

Signed and Sealed this

Fifth Day of January, 2010

David J. Kappos
*Director of the United States Patent and Trademark Office*